US006498616B1

(12) United States Patent
Nagumo et al.

(10) Patent No.: US 6,498,616 B1
(45) Date of Patent: Dec. 24, 2002

(54) PRINT HEAD HAVING NON-VOLATILE MEMORY AND MEANS FOR TRANSMITTING CORRECTION AND INHERENT DATA

(75) Inventors: Akira Nagumo; Minoru Teshima; Jiro Tanuma, all of Tokyo (JP)

(73) Assignee: OKI Data Corporation, Tokyo (JP)

( * ) Notice: Subject to any disclaimer, the term of this patent is extended or adjusted under 35 U.S.C. 154(b) by 41 days.

(21) Appl. No.: 09/648,961

(22) Filed: Jun. 15, 2000

Related U.S. Application Data

(63) Continuation-in-part of application No. 08/907,954, filed on Aug. 11, 1997, now abandoned.

(30) Foreign Application Priority Data

Aug. 14, 1996 (JP) .............................................. 8-232474

(51) Int. Cl.⁷ .............................................. B41J 2/435
(52) U.S. Cl. ..................................... 347/237; 347/240
(58) Field of Search .............................. 347/237, 236, 347/130, 240, 19, 15, 188; 358/1.9, 1.1, 1.16, 1.18, 296, 298

(56) References Cited

U.S. PATENT DOCUMENTS 4,746,941 A * 5/1988 Pham et al. ............ 347/237 X
5,818,501 A * 10/1998 Ng et al. ................ 347/237 X

FOREIGN PATENT DOCUMENTS

JP     63-37969 A * 2/1988 .............. B41J/3/21
JP     3-268953 A * 11/1991 .............. B41J/2/35

* cited by examiner

Primary Examiner—David F. Yockey
(74) Attorney, Agent, or Firm—Rabin & Berdo, P.C.

(57) ABSTRACT

Adjustment of correction data for the respective LEDs at the end of manufacture of a print head is performed by transferring provisional correction data from a manufacturing device to an LED driver, directly, i.e., without once being stored in a storage circuit 10c in the print head, and measuring the amounts of light from the LEDs and varying the correction data, and repeating such an operation until the correction data is optimized. The optimized correction data as well as the strobe time data determined from the measured average power are written in the storage circuit 10c. During use of the printer, the data stored in the storage circuit 10c is used for correction of the data and determination of the strobe time.

27 Claims, 8 Drawing Sheets

PRINT HEAD HAVING NON-VOLATILE MEMORY AND MEANS FOR TRANSMITTING CORRECTION AND INHERENT DATA

CROSS-REFERENCE TO A RELATED APPLICATION

The present application is a continuation-in-part of a U.S. patent application Ser. No. 08/907,954 filed on Aug. 11, 1997, now abandoned.

BACKGROUND OF THE INVENTION

The present invention relates to a print head having an array of print elements each driven to print a dot at a time. More particularly, the invention relates to adjustment of the driving power with which each of the print elements is driven. A typical example of such a printer is an electrophotographic printer having an array of LEDs (light-emitting diodes) as the print elements, and the driving power is in the form of a current supplied to each LED.

Electrophotographic printers have been widely used as printers for printing texts and pictures prepared by computers or the like. FIG. 8 shows the configuration of a printing unit in such an electrophotographic printer. When texts or pictures are printed, negative charges are applied by a charging roller 1 to a rotating photosensitive drum 2 to negatively and uniformly charge the photosensitive drum 2. A print head 3 comprising a plurality of LEDs illuminate the photosensitive drum 2 to form an electrostatic latent image of the text or picture to be printed. A developer 5 causes negatively-charged toner 6 to be adhered to the electrostatic latent image to achieve development. A transfer roller 4 to which a positive voltage is applied from a transfer power supply 8 transfers the toner on the photosensitive drum 2 to a printing paper 7. The toner is thereafter fixed on the paper 7 by a fixing device, not shown.

The print head 3 forming the electrostatic latent image in this way is formed of an LED array, an LED driver and the like. The LED array comprises a plurality of LED array units each of which is in the form of a separate semiconductor chip, and the entire LED array is formed of several thousands LEDs aligned in the direction perpendicular to the direction of the paper transport in FIG. 8. The LED driver is formed of as many drive transistors as there are LEDs. The drive transistors are selectively turned on depending on the image data representing the text or picture to be printed. The period for which the transistors are turned on is determined by a common strobe signal supplied from a control unit controlling the entire printer. When the transistors are turned on, a current is flows to the LEDs connected with the transistors.

The LEDs in the LED array in the print head have certain variations in the relationship between the current supplied thereto, and the amount of light emitted therefrom, due to fluctuations or the like in the manufacturing conditions in the factory. The amount of light emitted with respect to the current supplied thereto is called light emitting efficiency. Such variations are more prominent between LED array units than between individual LEDs in each LED array unit.

There is also variations in the characteristics (due to the differences in the resistance of the semiconductor elements) between drive transistors in the LED driver. Some transistors permit a large current to flow while others permit a small current, under the same voltage. Such a variation is also more prominent between LED driver ICs than between the individual transistor elements in each LED driver IC.

Because of the variations in the characteristics of the LEDs and the transistors, LED array units and LED driver ICs are classified into several ranks according to their characteristics, during the manufacture of the LED array units and the LED driver ICs, and LED array units and LED driver ICs of the same rank are used together to form a head. By such classification, one LED head is formed of LED array units having a high light emitting efficiency, while another LED head is formed of LED array units of a relatively low light emitting efficiency. The variation in the characteristics between the LED array units in each LED head can be reduced in this way. Similarly, one LED head is formed of driver ICs having transistors of a high resistance, and another LED head is formed of driver ICs having a low resistance.

With the prior art print heads, to reduce the difference in the amount of emitted light between LED elements, a non-volatile storage element is provided in the LED head, and correction (or compensation) data are set for use in correcting the current flowing through the LEDs. During the manufacture of the head, the correction data are determined in the following manner. First, provisional correction data are set, and written in the non-volatile storage circuit in the LED head, and transferred to the LED driver, and the amount of light emitted from each LED driven in accordance with the provisional correction data is measured, and second provisional correction data are set by modifying the first provisional correction data on the basis of the result of the measurement. Such a procedure is repeated, such that appropriate correction data is finally obtained.

The optimum amount of energy (total amount of emitted light) per dot used for exposure of the photosensitive drum is predetermined. The total amount of emitted light can be represented by the product of the light emission power and the length of time period of the emission, i.e., the time period for current flow (i.e., strobe time). Accordingly, the strobe time must be determined to an appropriate value based on the characteristics of the LEDs and transistors. For instance, a relatively short strobe time must be set for an LED head formed of LEDs having a high light emitting efficiency, while a relatively long strobe time must be set for an LED head formed of LEDs having a low light emitting efficiency.

In order to set the strobe time in this way, during the manufacture of the LED heads, the average light emitting power of the dots of the LED head is determined, and is written in a bar code label, which is then attached to the print head. During assembly of the printer, i.e., during assembly of the printing unit and control unit to complete a printer, the average light emitting power written in the bar code label is read, and used for calculating the strobe time, and the strobe time data representing the calculated strobe time is written in the non-volatile memory in the control unit. During use of the printer for printing, the control unit sends a strobe signal of a time length represented by the strobe time data read from the non-volatile memory, to the LED head, together with image data to be printed, received from a computer. In this way, the LEDs emit light only for the duration of the strobe time, in forming the electrostatic latent image on the photosensitive drum.

In adjusting or optimizing the correction data for the conventional print head, writing and erasure of the non-volatile memory, whose operating speed is low, are repeated many times, so that a long time is needed, and as a result, the time required for the manufacture of the printer is long, with the result that the cost of manufacture of the printer becomes high.

Moreover, attaching a bar code label, and reading the information from the bar code label also lengthens the time for manufacturing the printer, and the cost of manufacture of the printer is further increased.

SUMMARY OF THE INVENTION

An object of the invention is to solve the problems described above.

Another object of the invention is to provide a print head which can be manufactured in a shorter period, and at a lower cost.

According to a first aspect of the invention, there is provided a print head of a printer comprising an array of print elements, including:

a plurality of print elements each selectively driven to print a dot;

a driver formed of a plurality of drive elements provided for the respective print elements, for driving the print elements in accordance with print data representing the image to be printed and correction data for adjusting the driving power for each print element;

a storage circuit into which the correction data input from the outside of the print head are written, and from which the correction data are sent to the driver; and a sending means for sending the correction data supplied from the outside to the driver.

According to a second aspect of the invention, there is provided a print head of a printer comprising an array of print elements, including:

a plurality of print elements each selectively driven to print a dot;

a driver formed of a plurality of drive elements provided for the respective print elements, for driving the print elements in accordance with print data representing the image to be printed and correction data for adjusting the driving power for each print element;

a storage circuit into which the correction data input from the outside of the print head are written, and from which the correction data are sent to the driver; and wherein the correction data stored in the storage circuit is read and sent to the outside of the print head via said sending means.

DETAILED DESCRIPTION OF THE PREFERRED EMBODIMENTS

In the following description of embodiments, the printer is assumed to be an electrophotographic printer having an array of LEDs, but the invention is also applicable to printers in which the array of printing elements are formed of thermal heads, or plasma-display panel (PDP) heads.

Figure 1:
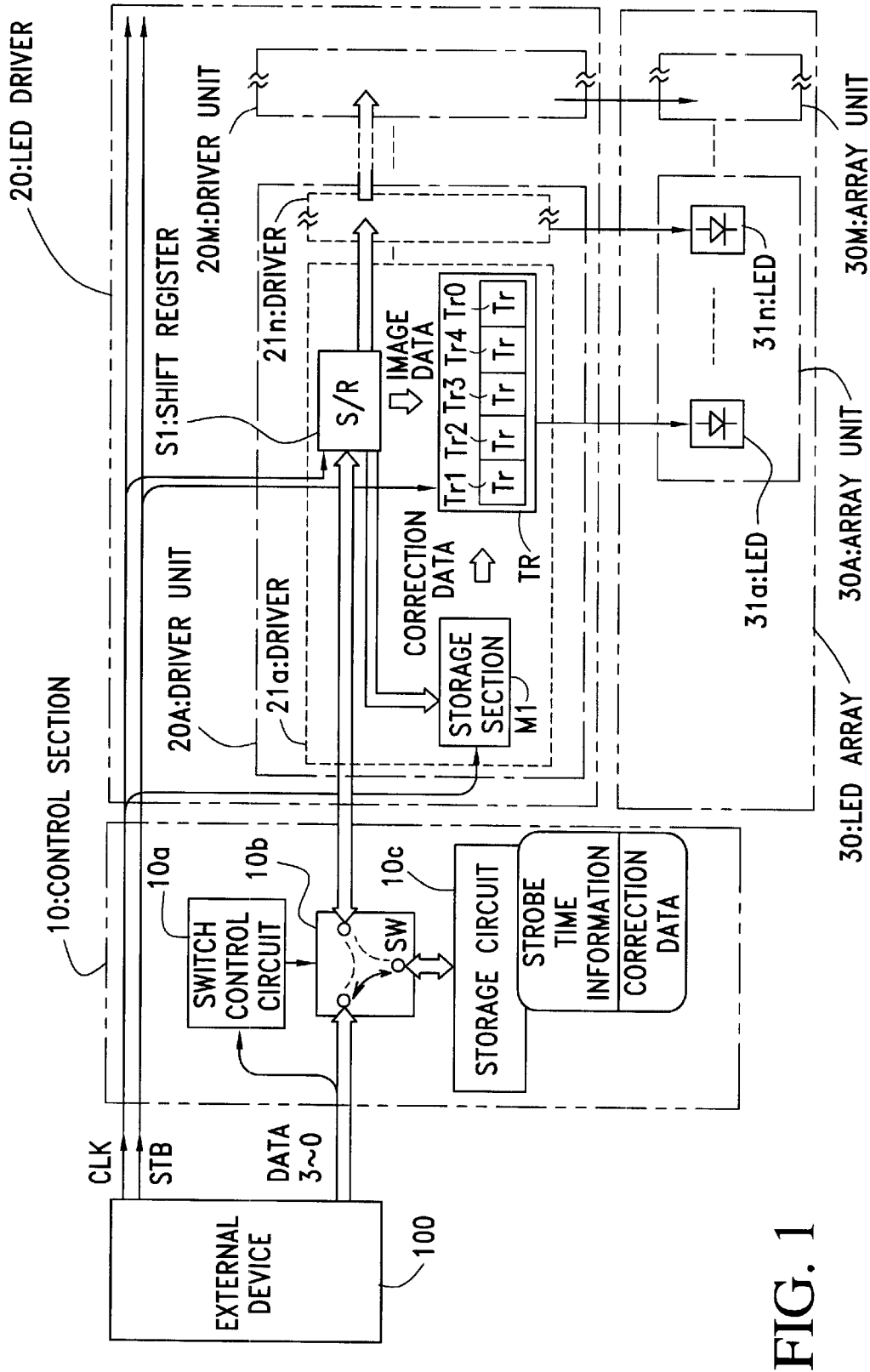
FIG. 1 is a block diagram of a print head according to the invention.

FIG. 1 shows the configuration of a print head of an embodiment.

The illustrated print head comprises a control section 10, an LED driver 20, and an LED array 30. The print head is shown to be connected to an external device 100, which may be a manufacturing device, a maintenance device, or a control unit. The manufacturing device is used during manufacture of the print head or a printer incorporating the print head. The control device is part of a printer and controls the overall operation of the printer.

The control section 10 comprises a switch control circuit 10$a$, a switch circuit 10$b$, and a storage circuit 10$c$, and is supplied with a clock signal CLK, a strobe signal STB, a data signal DATA and the like from the external unit 100. The switch circuit 10$b$ switches the direction of transfer of the data signal DATA between the external unit 100, the storage circuit 10$c$ and the LED driver 20. The switch control circuit 10$a$ is responsive to a command signal on the data lines DATA from the external unit 100, for controlling the switching of the switch circuit 10$b$. Stored in the storage circuit 10$c$ are the correction (or compensation) data and strobe time data, sent from the external unit 100, as will be later described in detail.

Figure 2A:
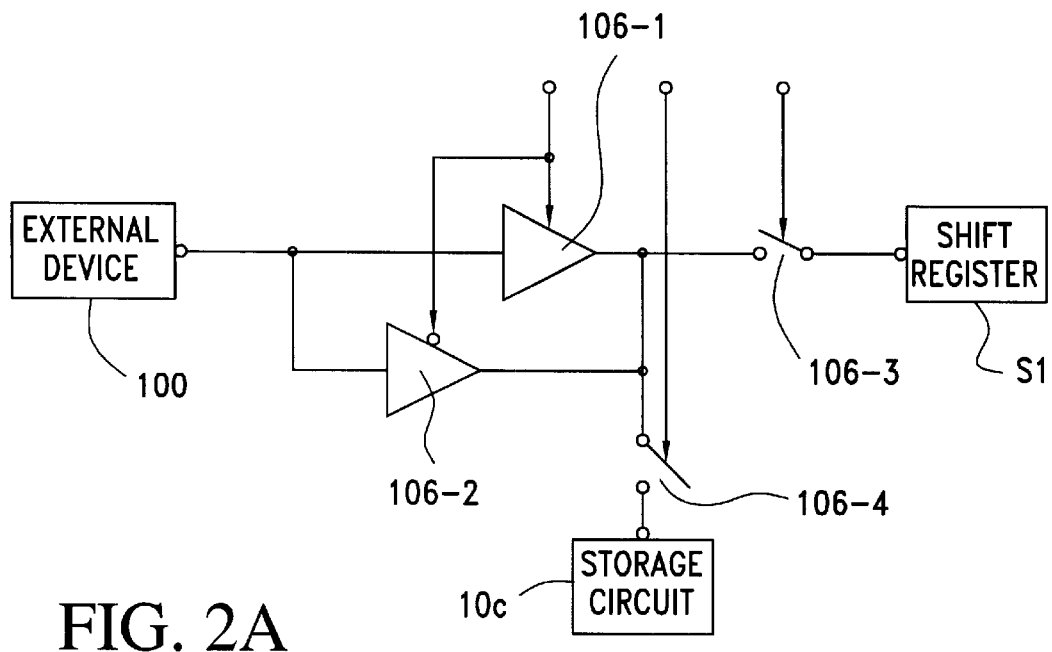
FIG. 2A is a block diagram of an example of a switch circuit according to the invention.

FIG. 2A shows an example of the switching circuit 10$b$. The switching circuit 10$b$ of FIG. 2A includes tri-state elements 10$b$-1 and 10$b$-2, and switches 10$b$-3 and 10$b$-4 interconnected as illustrated. By controlling the state of the tri-state elements 10$b$-1 and 10$b$-2, and selectively turning on and off the switches 10$b$-3 and 10$b$-4, the switching circuit 10$b$ provides data transfer routes for operation in an adjustment mode, a write mode, a read mode and a transfer mode.

Figure 2B:
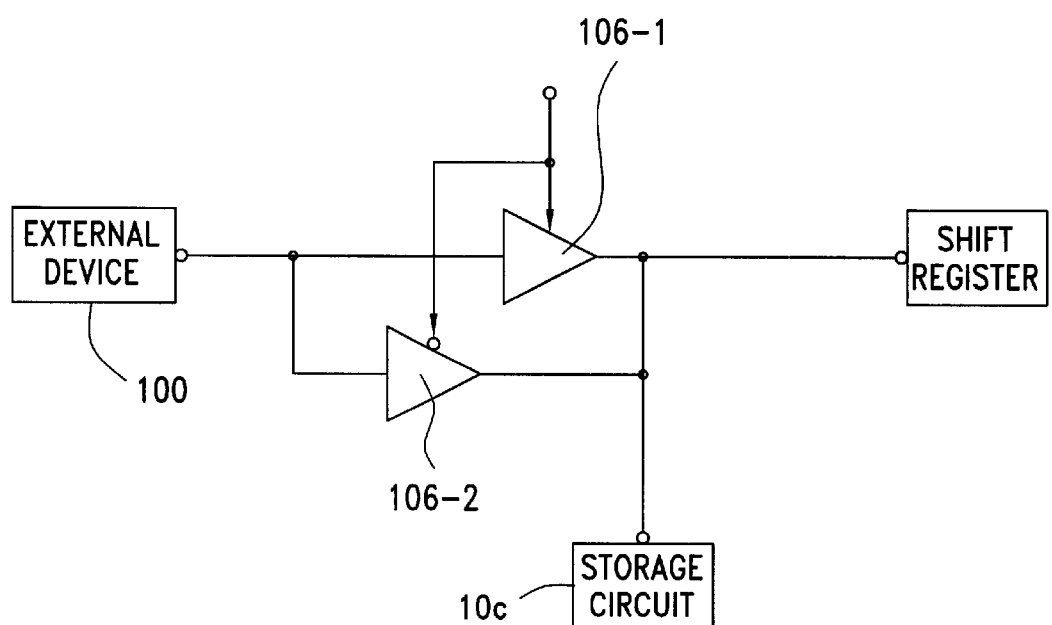
FIG. 2B is a block diagram of another example of a switch circuit according to the invention.

FIG. 2B shows another example of the switching circuit 10$b$. The switching circuit 10$b$ of FIG. 2B is similar to the switching circuit 10$b$ of FIG. 2A but the switches 10$b$-3 and 10$b$-4 are removed and short-circuited.

The LED array 30 of FIG. 1 is formed of a plurality of array units (semiconductor chips) 30A to 30M, and the LED driver 20 is also formed of the same number of driver units (semiconductor chips) 20A to 20M. Each of the array units 30A to 30M is formed of a plurality of LEDs 31$a$ to 31$n$, and similarly, each of the driver units 20A to 20M is formed of the same number of drive elements 21$a$ to 21$n$.

Each of the drive elements 21$a$ to 21$n$ is formed of a transistor section TR comprising a main drive transistor Tr0 and four auxiliary drive transistors Tr1 to Tr4, a shift register S1, and a memory M1, to drive the corresponding one of the LEDs 31$a$ to 31$n$. The auxiliary drive transistors are provided to correct the amount of emitted light to improve the uniformity or evenness. For instance, when the light emitting efficiency of a certain LED 31$a$ is low, all the transistors Tr1 to Tr4 are turned on to drive the LED 31$a$ with a larger current. When the light emitting efficiency of the LED 31$a$ is high, all the transistors Tr1 to Tr4 are turned off, to drive the LED 31$a$ with a smaller current. If the light emitting efficiency is intermediate, the transistors Tr1 to Tr4 are selectively turned on. With respect to other LEDb to LEDn, the amount of emitted light is adjusted in the same manner. In this way, the amount of emitted light is made substantially uniform.

The shift register S1 is for transferring image data, and the storage section M1 is for storing the correction data. The storage section M1 for storing the correction data is formed of registers or SRAM cells capable of high-speed writing and high-speed reading. Each of the LEDs in the LED array 30 is selectively driven based on the image data from the shift register S1 to emit light. The current supplied to each LED is adjusted according to the correction data, as described above. The time period for which the LEDs are driven (supplied with a drive current) is determined by the strobe signal STB.

When the print head is incorporated in a printer, a control unit is connected as the external device 100 to the print head as described above. When the power supply to the printer is turned on, the control unit reads the strobe time data from the storage circuit 10c, and causes the strobe time data to be stored in a register in a strobe signal generating circuit, not shown, provided in the control unit 100, which thereafter produces strobe signals having a duration (or pulse width) determined by the strobe time data. The control unit 100 also sends the clock signal CLK via the control section 10 to the LED driver 20, to drive the shift register S1, thereby setting the correction data from the storage circuit 10c in the LED driver 20.

During printing, the control unit 100 sends the image data received from a computer, not shown, to the LED driver 20, via the data lines DATA, and thereafter drives the strobe signal line STB for a predetermined strobe time. In this way, the LEDs 31a to 31n in the LED array 30 are driven for a period while the strobe signal line STB is active, to illuminate the photosensitive drum 2 to form an electrostatic latent image of the image to be printed.

The transfer of data from the external device 100, to the shift register S1 in the LED drover 20, or to the storage circuit 10c, from the storage circuit 10c to the shift register S1 in the LED driver 20, or to the external device 100 in various modes of operation is controlled by the operation of the switching circuit 10b of FIG. 2A or FIG. 2B. First it is assumed that the switching circuit 10b of FIG. 2A is used. In this case the transfer of data is controlled by the tri-state elements 10b-1 and 10b-2, and the switches 10b-3 and 10b-4 as well as application of enable signals to the shift register S1 in the LED driver 20 and to the storage circuit 10c.

In both the adjustment mode and the write mode, the tri-state element 10b-1 is made active (conductive), while the tri-state element 10b-2 is turned off (in a high-impedance state). In the adjustment mode, the switch 10b-3 is closed while the switch 10b-4 is open, and the shift register S1 is enabled to receive the data from the external device 100, while the storage circuit 10c is disabled. In the write mode, the switch 10b-4 is closed while the switch 10b-3 is open, and the storage circuit 10c is enabled to receive the data from the external device 100, while the shift register S1 is disabled.

In the read mode, the switch 10b-4 is closed while the switch 10b-3 is open, and the tri-state element 10b-2 is active, while the tri-state element 10b-1 is turned off, and the shift register S1 is disabled. Accordingly, the data from the storage circuit 10c is transferred to the external device 100, and is not written into the shift register S1.

In the transfer mode, the switches 10b-3 and 10b-4 are both closed, the tri-state elements 10b-1 and 10b-2 are both turned off, and the shift register S1 is enabled. Accordingly, the data from the storage circuit 10c is transferred to the shift register S1, and not to the external device 100.

The operation of the tri-state elements 10b-1 and 10b-2 and the switches 10b-3 and 10b-4 is controlled by the switch control circuit 10a. The application of the enable signals to the storage circuit 10c and the shift register S1 is also controlled by the switch control circuit 10a.

When the switching circuit of FIG. 2B is used in place of the switching circuit 10b of FIG. 2A, the transfer of data is controlled by the tri-state elements 10b-1 and 10b-2, as well as application of enable signals to the shift register S1 in the LED driver 20 and to the storage circuit 10c. That is, the operation is identical to that of the circuit of FIG. 2A, except that the control over the switches 10b-3 and 10b-4 are unnecessary since the switches 10b-3 and 10b-4 are not provided. The transfer of data to the shift register S1 and to the storage circuit 10c is controlled by the controlled application of the enable signals to the shift register S1 and the storage circuit 10c. The operation is in effect identical to the operation of the circuit of FIG. 2A even though the switches 10b-3 and 10b-4 are not provided.

Manufacture of a Print Head

Upon manufacture of each LED array units (semiconductor chips), the amounts of light emitted from LEDs (under the condition of a constant drive current) are measured and their average value is determined, and they are classified into five ranks (A to E) according to the average value. Upon manufacture of the driver ICs, the average value of the drive currents supplied (under the condition of a constant drive voltage) is determined, and they are classified into five ranks (A to E) according to the average value. Print heads are formed by assembling the LED array units of the same rank, and driver ICs of the same rank. LED array units of a higher rank are assembled with driver ICs of a lower rank. For instance, the LED array units of rank A are assembled with the driver ICs of the rank E; the LED array units of rank B are assembled with the driver ICs of the rank D; the LED array units of rank C are assembled with the driver ICs of the rank C; the LED array units of rank D are assembled with the driver ICs of the rank B; and the LED array units of rank E are assembled with the driver ICs of the rank A.

Adjustment Mode (ADJUST)

At the final stage of manufacture of a print head, i.e., after the LED array units and driver ICs are assembled, a manufacturing device is connected (as the external device 100) to the print head, and the amounts of the light emitted from the LEDs under the condition of a constant voltage are measured, and their average value is determined, and a strobe time is calculated based on the average value.

Figure 3:
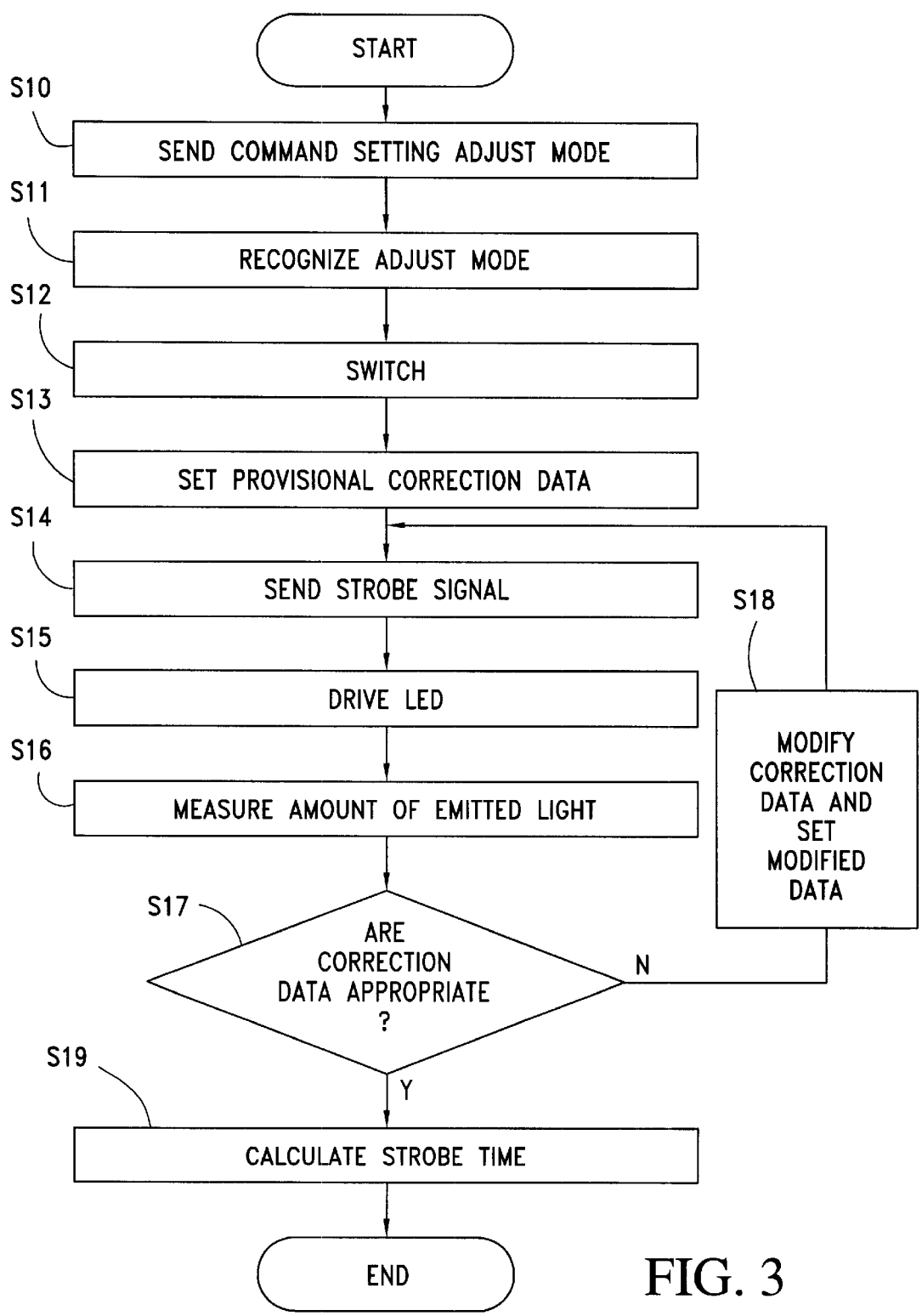
FIG. 3 is a flowchart showing the operation in the adjustment mode.

The sequence of operation in the adjustment (ADJUST) mode is illustrated in FIG. 3.

In an initial step S10, the manufacturing device 100 connected to the print head sends a command signal designating the adjustment mode, onto the data lines DATA, and the clock signal CLK to the control section 10.

In a next step S1, the switch control circuit 10a in the control section 10 analyzes the received command signal, and recognizes the adjustment (ADJUST) mode.

In a step S12, the switch control circuit 10a switches the switch circuit 10b and controls the application of the enable signals to the shift register S1 and the storage circuit 10c so that the correction data is transferred from the manufacturing device to the LED driver 20.

In a step S13, the manufacturing device sends the provisional correction data onto the data lines DATA, and sends the clock signal CLK, separately, to thereby set the provisional correction data in the storage section M1.

In a step S14, the manufacturing device sends the test image data onto the-data lines DATA, and generates a strobe signal STB.

In a step S15, the LED driver 20 drives the LEDs 31a to 31n in the LED array 30.

In a step S16, the amounts of light emitted from the LEDs 31a to 31n that are driven are measured dot by dot by a light amount measurement instrument (power meter), and the result of the measurement is stored and displayed as desired by the manufacturing device.

In a step S17, judgment is made as to whether the variation in the amount of emitted light is within a predetermined range, and whether the correction data for the respective LEDs is appropriate.

In a step S18, if the correction data are inappropriate, the correction data are modified, and the modified correction data are set directly into the LED driver, bypassing the storage circuit 10c. In this way, the correction data can be transferred to the LED driver at a high speed.

When, at step S17, it is found that the variation in the amount of emitted light is within a predetermined range, then the correction data being used for the drive of the LEDs are found to be appropriate, and the strobe time required is calculated based on the average value of the light emitted from the LEDs, and the total amount of illumination which the photosensitive drum requires.

As has been described, during the adjustment, the correction data for each LED in the LED array is transferred from the manufacturing device, i.e., from the outside of the print head directly to LED driver, i.e., without once being stored in the storage circuit 10c. Accordingly, the correction data can be easily modified and sent to the LED driver. The correction data for each LED can therefore be determined quickly. Moreover, the strobe time can be calculated based on the amount of emitted light measured in determining the correction data.

Write (WR) Mode

When the appropriate correction data and the strobe time are determined, they are written from the manufacturing device into a storage circuit 10c in the print head. The type of the print head (the length of the print head which limits the size of the paper to be printed is known from the information on the type) may also be written into the storage circuit 10c.

Figure 4:
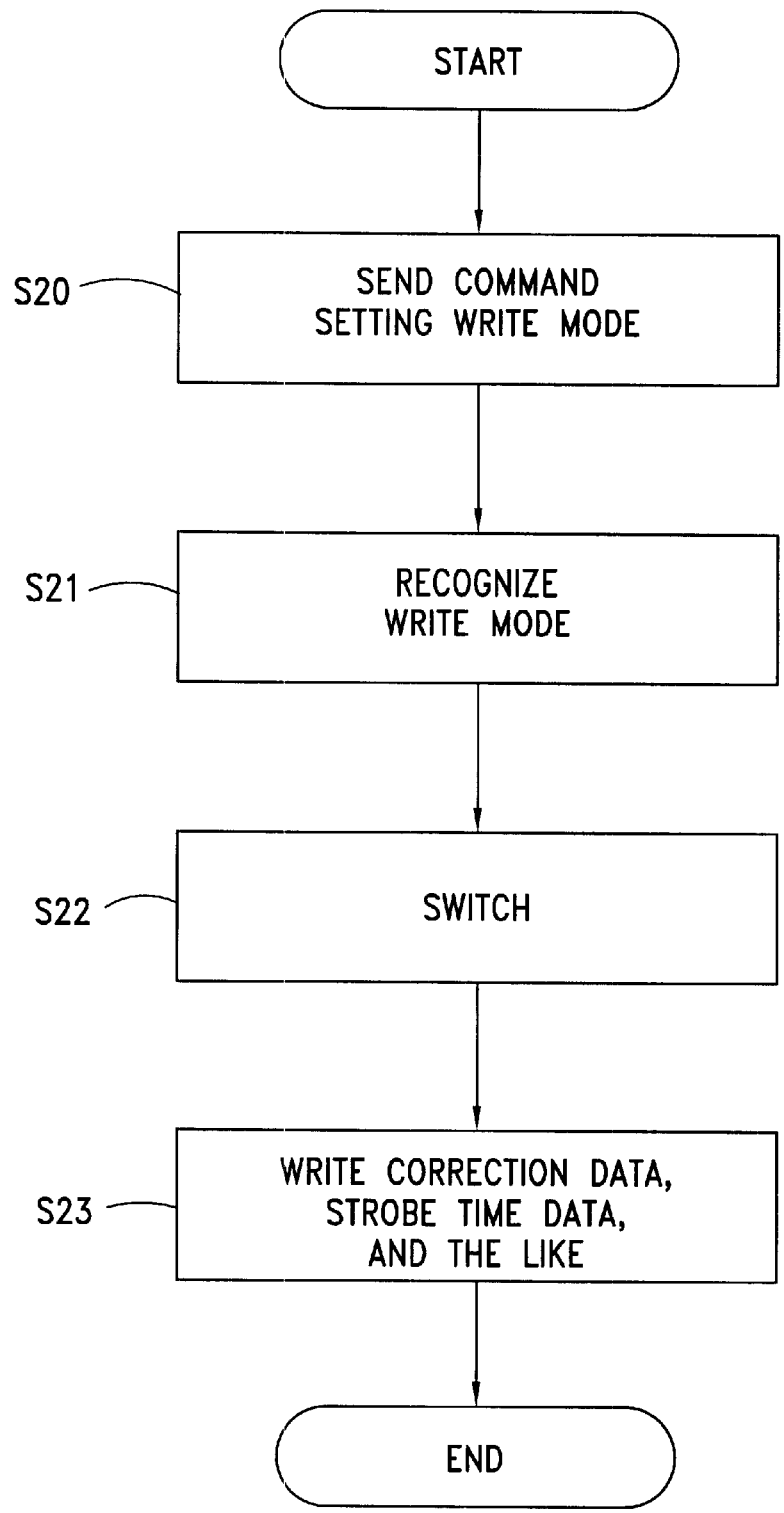
FIG. 4 is a flowchart showing the operation in the write mode.

The sequence of operation in the write (WR) mode is shown in FIG. 4.

In a step S20, the command signal designating the write mode (WR) is sent from the manufacturing device to the print head via the data lines DATA, and the clock signal CLK is sent separately to the control section 10.

In a step S21, the switch control circuit 10a in the control section 10 analyzes the received command signal and recognizes the write mode.

In a step S22, the switch control circuit 10a switches the switch circuit 10b and controls the application of the enable signals to the shift register S1 and the storage circuit 10c so that the correction data and the strobe time data obtained in the adjustment mode (ADJUST) are transferred from the manufacturing device to the storage circuit 10c.

In a step S23, the manufacturing device sends the strobe time data, data representing the type of the head (including the head-type data and head-version data), correction data and the like onto the data lines DATA. These items of data are written in the storage circuit 10c.

Figure 5:
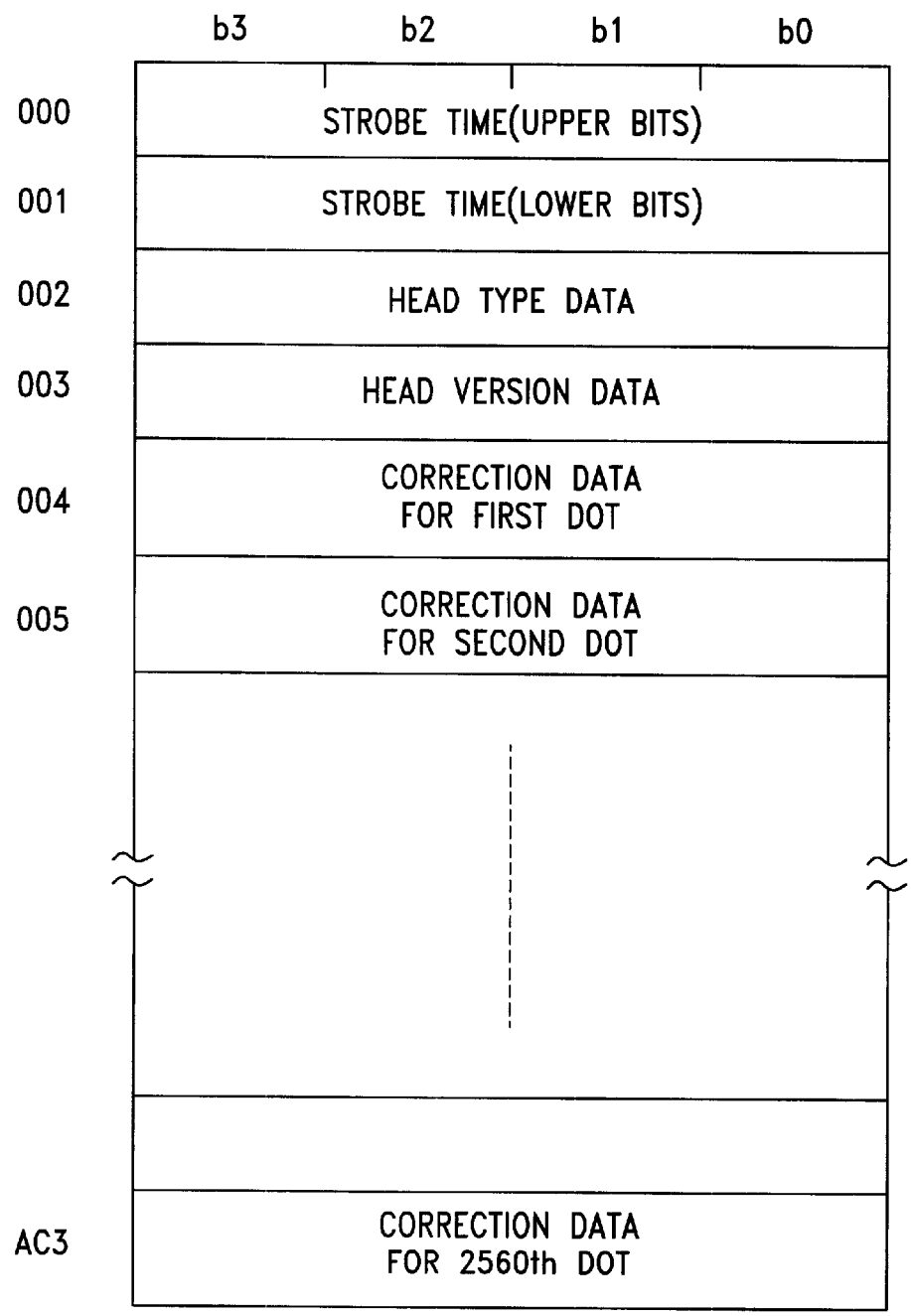
FIG. 5 is a map of the storage circuit according to the invention.

When the storage circuit 10c is of a type which permits writing and reading in a sequential manner, the above-mentioned data should preferably be stored in the storage circuit 10c in the order shown in FIG. 5. As illustrated, the strobe time data, the head type data and the head version data are stored first, and the correction data are stored next (at the addresses following the addresses where strobe time data, the head type data and the head version data are stored). With such a data arrangement, it is possible to read the strobe time data, the head type data and head version data first, and set the printer with these data, before the correction data for individual LEDs are read, during subsequent use of the printer (into which the print head is assembled).

Moreover, the correction data should preferably be stored sequentially, at consecutive addresses. This simplifies the control for address management by a control circuit, not shown, over the storage circuit 10c during the transfer of the correction data into the shift register S1. This is because the transfer of the correction data can be managed by sequentially incrementing the address value in an address counter from an initial value, such as "000", while the correction data are transferred to the storage section M1 via the shift register S1 (during subsequent use of the printer into which the print head is assembled). Accordingly, actions for identifying the addresses at which the storage of the correction data starts and ends can be omitted.

Since the strobe time is stored in the storage circuit 10c upon manufacture of the print head, it is not necessary, in contrast to the prior art, to write the strobe time data in a bar code label, and read the strobe time data from the bar code label, and later write it into the non-volatile memory in the control unit 100 (separate from the print head) during the assembly of the printer. The time required for the manufacture can be shortened and the cost of manufacture can be lowered.

Read (RD) Mode

Figure 6:
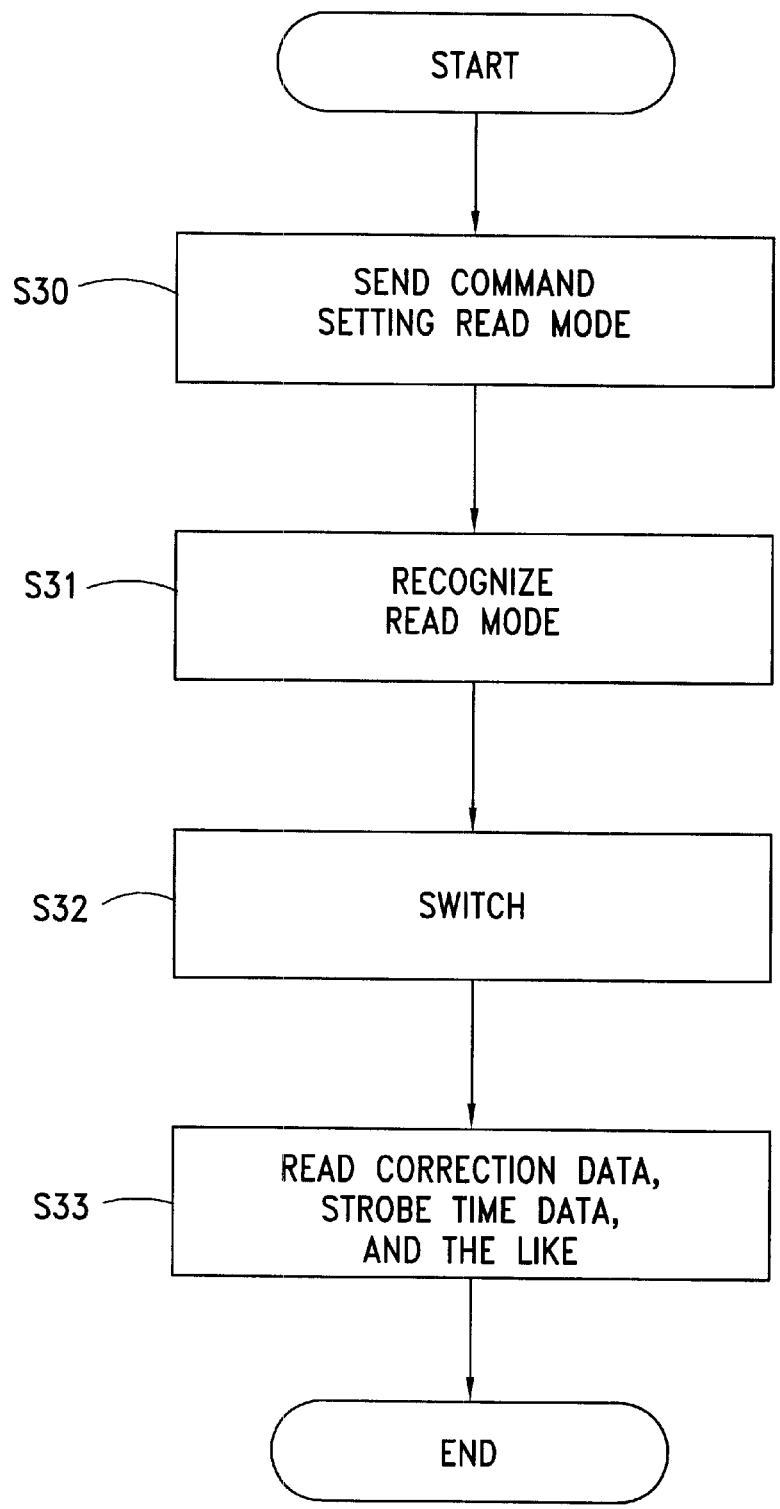
FIG. 6 is a flowchart showing the operation in the read mode.

The sequence of operation in the read mode (RD) is shown in FIG. 6. The operation in the read mode is performed during manufacture of a print head or a printer, or maintenance of the printer.

In the operation in the read mode, the strobe time data, the head type data, the head version data, the correction data and the like which have been written in the storage circuit 10c are read by the manufacturing device, or the maintenance device.

In a step S30, the manufacturing device (in the case of operation during adjustment), or the maintenance device (in the case of the operation during maintenance) sends a command signal designating the read mode onto the data lines DATA, and sends the clock signal CLK to the control section 10.

In a step S31, the switch control circuit 10a in the control section 10 analyzes the received command signal and recognizes the read mode.

In a step S32, the switch control circuit 10a switches the switch circuit 10b and controls the application of the enable signals to the shift register S1 and the storage circuit 10c so that the strobe time data, the head type data, the head version data, the correction data and the like are sent from the storage circuit 10c to the manufacturing device or the maintenance device.

In a step S33, the manufacturing device or the maintenance device reads these data from the storage circuit 10c.

The data having been read are displayed by a display section, not shown, of the manufacturing device or maintenance device, and can therefore by compared or verified with master data used for writing in the write mode during manufacture of the print head.

Thus, the correction data are thus written in the storage circuit 10c in the print head, and thereafter read and supplied to the outside. As a result, whether the correction data having been determined are written correctly can be checked by reading them. Furthermore, the information concerning the printer, such as the type of the print head can also be written and read. This information can be utilized during assembly of a pointer to ensure that the correct type of print head is used for the assembly of each printer.

During maintenance of the printer, the maintenance device 100 can read the information concerning the print head, stored in the storage circuit 10*c*, and various controls can be performed based on the information having been read. As a result, replacement-of the print head is facilitated.

Transfer (TR) Mode

Figure 7:
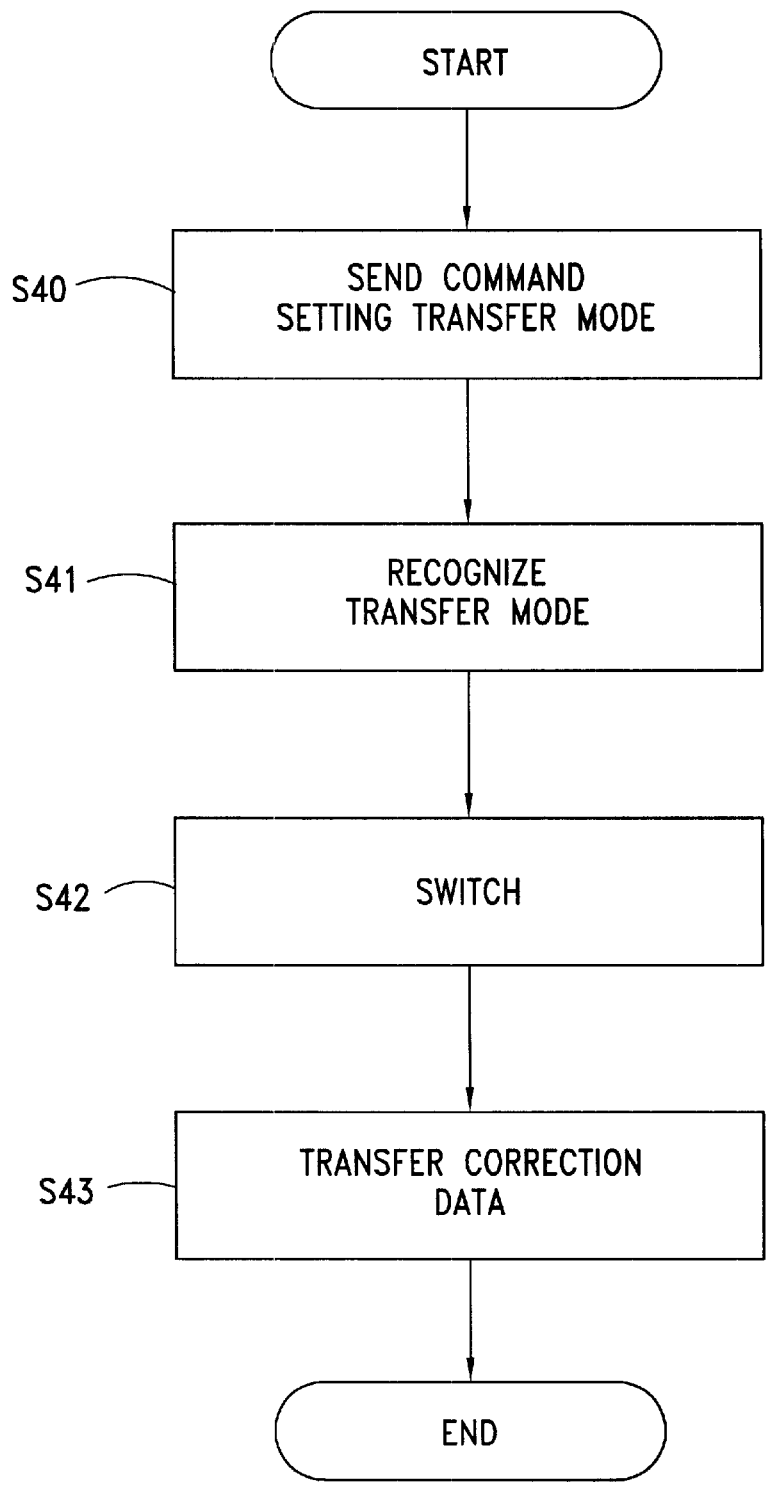
FIG. 7 is a flowchart showing the operation in the transfer mode.
Figure 8:
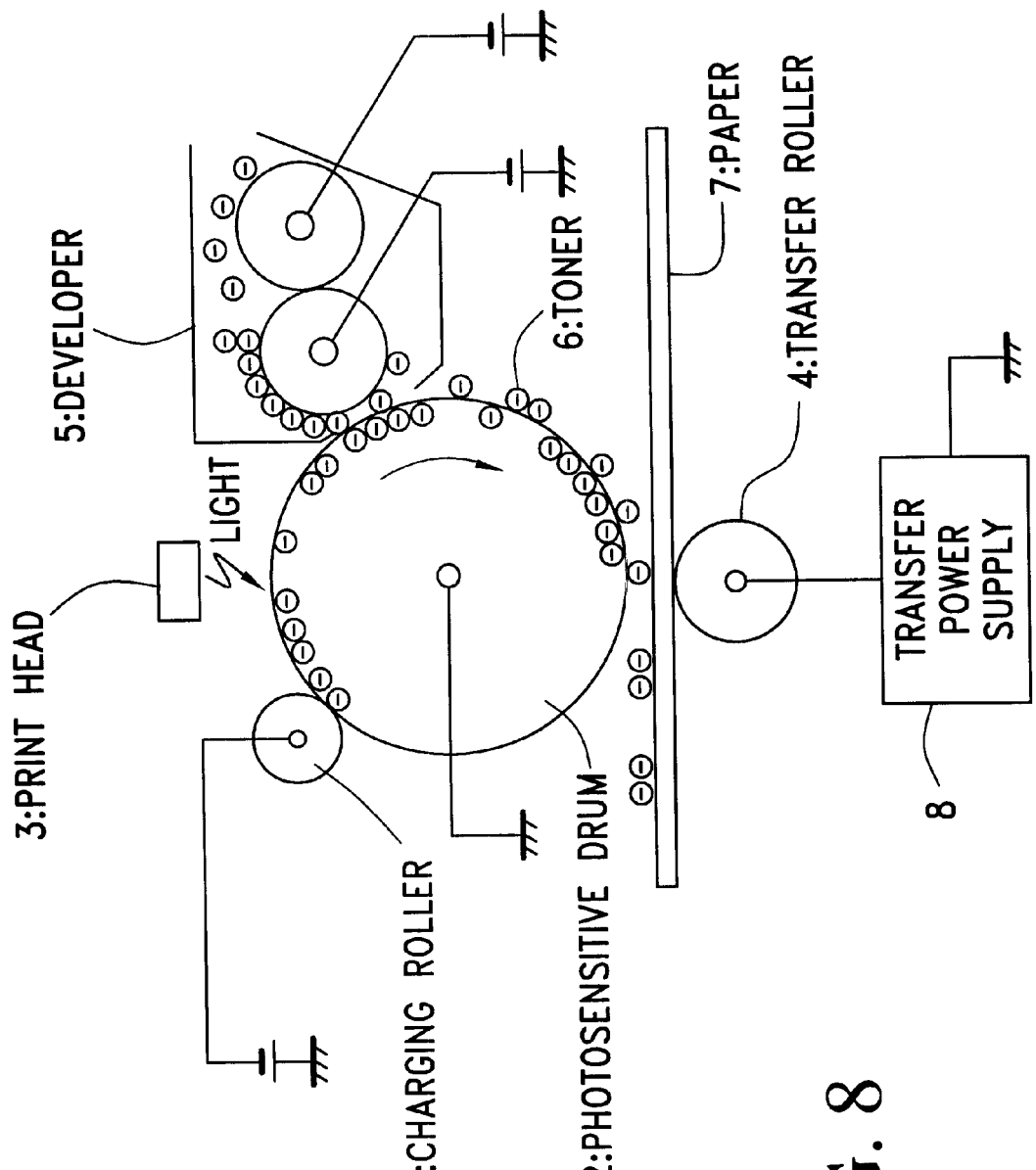
FIG. 8 shows the configuration of a conventional electrophotographic printer.

The sequence of operation in the transfer mode is shown in FIG. 7. The operation in the transfer mode is performed during use of the printer, and during maintenance. In the operation in the transfer mode, the correction data stored in the storage circuit 10*c* are transferred to the LED driver 20.

In a step S40, the control unit (or a maintenance device) sends a command signal designating the transfer mode, onto the data lines DATA, and sends the clock signal CLK to the control section 10.

In a step S41, the switch control circuit 10*a* in the control section 10 analyzes the received command signal and recognizes the transfer mode.

In a step S42, the switch control circuit 10*a* switches the switch circuit 10*b* and controls the application of the enable signals to the shift register S1 and the storage circuit 10*c* so that the correction data stored in the storage circuit 10*c* are transferred to the LED driver 20.

In a step S43, the correction data stored in the storage circuit 10*c* are set in the LED driver 20, by driving the shift register S1 by means of the clock signal CLK.

In the above embodiment, the strobe time is calculated and stored in the storage circuit 10*c* during manufacture of the print head. As an alternative, data representing the average value of the emitted light may be determined and stored in the storage circuit 10*c*. The data representing the average value may be data which indicates the rank of the print head. That is, the print heads may be classified into ranks, e.g., five ranks A to E, according to the average value of the emitted light, and the indication of the rank may be used as the data representing the average value.

In such a case, the data representing the average value may be read from the storage circuit 10*c* and supplied to the manufacture device during assembly of a printer, and used for calculating the strobe time. The calculated strobe time may be stored in a non-volatile memory in the control unit. Alternatively, the data representing the average value may be read each time a power supply to the printer is turned on, or connected, and used for calculation of the strobe time. The calculated strobe time may be stored in a volatile memory in the control unit of the printer.

In the appended claims, the term "inherent data of the print head" should be construed to cover the data representing the average value, and the data representing the strobe time, as well as any other type of data which represents the characteristics of the print head, or which is obtained based on the data representing the characteristics of the print head, and may be used as a basis of calculation of the strobe time.

What is claimed is:

1. A print head of a printer comprising:
   a plurality of print elements;
   a driver formed of a volatile, relatively high-speed, storage section for storing correction data received from a source outside of the print head, and a plurality of drive elements for selectively supplying and adjusting driving power applied to respective corresponding ones of the print elements in accordance with print data representing an image to be printed and the correction data, wherein each of said print elements prints a dot when said driver supplies driving power thereto;
   a non-volatile, relatively low-speed, storage circuit for receiving the correction data from the outside source and storing the received correction data; and
   means for transmitting the correction data stored in the non-volatile storage circuit to the volatile storage section of said driver when said means is in a first state, and for transmitting the correction data from the outside source to the driver, without writing the correction data in said non-volatile storage circuit, when said means is in a second state.

2. The print head according to claim 1, wherein said transmitting means, in a third state, transmits the correction data stored in the non-volatile storage circuit to the outside source.

3. The print head according to claim 2, wherein
   said non-volatile storage circuit also stores inherent data of the print head,
   said transmitting means transmits the inherent data to the outside source, and
   said driver receives from the outside source an inherent data signal indicative of the inherent data and selectively supplies and adjusts the driving power applied to each of the print elements also in accordance with said inherent data signal.

4. The print head according to claim 3, wherein said inherent data comprises data representing a strobe time.

5. The print head according to claim 3, wherein said inherent data comprises average value data representing an average value of light emitted from each of the print elements, and
   said driver is responsive to a signal from the outside source indicative of a strobe time determined in accordance with said average value data for adjusting the driving power applied to each of the print elements in accordance with the determined strobe time.

6. The print head according to claim 3, wherein
   the driver includes a shift register for sequentially transferring the print data and the correction data to corresponding drive elements; and
   the inherent data is stored at such addresses in the non-volatile storage circuit, that when data, including the inherent data and the correction data, are sequentially read from the non-volatile storage circuit, the inherent data is read before the correction data is read.

7. The print head according to claim 3, wherein said inherent data comprises data representing characteristics of the print head.

8. The print head according to claim 1, wherein said transmitting means includes
   a switch circuit, and
   a control circuit for analyzing a switch command signal received from the outside source and producing a control signal based on a result of the analysis, wherein said switch circuit is selectively switched based on the control signal.

9. A print head of a printer, comprising:
   a plurality of print elements;
   a driver formed of a volatile, relatively high-speed, storage section for storing correction data received from a source outside of the print head, and a plurality of drive elements for selectively supplying and adjusting driving power applied to respective corresponding ones of the print elements in accordance with print data representing an image to be printed and the correction data, wherein each of said print elements prints a dot when said driver supplies driving power thereto;
   a non-volatile, relatively low-speed, storage circuit for receiving the correction data from the outside source and storing the received correction data; and means for transmitting the correction data stored in the non-volatile storage circuit to the outside source when said transmitting means is in a first state, wherein said storage circuit also stores inherent data of the print head, said transmitting means transmits the inherent data to the outside source, and said driver receives from the outside source an inherent data signal indicative of the inherent data and selectively supplies and adjusts the driving power applied to each of the print elements also in accordance with said inherent data signal.

10. The print head according to claim 9, wherein said inherent data comprises data representing a strobe time.

11. The print head according to claim 9, wherein said inherent data comprises average value data representing an average value of light emitted from each of the print elements, and said driver is responsive to a signal from the outside source indicative of a strobe time determined in accordance with said average value data for adjusting the driving power applied to each of the print elements in accordance with the determined strobe time.

12. The print head according to claim 9, wherein the driver includes a shift register for sequentially transferring the print data and the correction data to corresponding drive elements; and the inherent data is stored at such addresses in the non-volatile storage circuit, that when data, including the inherent data and the correction data, are sequentially read from the non-volatile storage circuit, the inherent data is read before the correction data is read.

13. The print head according to claim 11, wherein said inherent data comprises data representing characteristics of the print head.

14. A printer comprising a control device; and a printer head including;

a plurality of print elements, a driver formed of a volatile, relatively high-speed, storage section for storing correction data, and a plurality of drive elements for selectively supplying and adjusting driving power applied to respective corresponding ones of the print elements in accordance with print data representing an image to be printed and the correction data, wherein each of said print elements prints a dot when said driver supplies driving power thereto, a non-volatile, relatively low-speed, storage circuit for receiving the correction data from the control device, and storing the received correction data and inherent data of the print head, and means for transmitting the correction data stored in the non-volatile storage circuit to the volatile storage section of said driver, when said means is in a first state, the correction data from the control device to the driver, without writing the correction data in said non-volatile storage circuit, when said means is in a second state, and the inherent data and the correction data stored in the non-volatile storage circuit to the control device, when said means is in a third state, wherein said control device generates an inherent data signal corresponding to the inherent data and sends said inherent data signal to the driver, the driver adjusts the driving power applied to each of the print elements also in accordance with said inherent data signal.

15. The printer according to claim 14, wherein said inherent data comprises data representing a strobe time.

16. The printer according to claim 14, wherein said inherent data comprises average value data representing an average value of light emitted from each of the print elements, and said driver is responsive to a signal from the control device indicative of a strobe time determined in accordance with said average value data for adjusting the driving power applied to each of the print elements in accordance with the determined strobe time.

17. The printer according to claim 14, wherein the driver includes a shift register for sequentially transferring the print data and the correction data to corresponding drive elements; and the inherent data is stored at such addresses in the non-volatile storage circuit, that when data, including the inherent data and the correction data, are sequentially read from the non-volatile storage circuit, the inherent data is read before the correction data is read.

18. The printer according to claim 14, wherein said inherent data comprises data representing characteristics of the print head.

19. A printer comprising a control device; and a printer head including;

a plurality of print elements, a driver formed of a volatile, relatively high-speed, storage section for storing correction data, and a plurality of drive elements for selectively supplying and adjusting driving power applied to respective corresponding ones of the print elements in accordance with print data representing an image to be printed and the correction data, wherein each of said print elements prints a dot when said driver supplies driving power thereto, a non-volatile, relatively low-speed, storage circuit for receiving the correction data from the control device, and storing the received correction data and inherent data of the print head, and means for transmitting the inherent data and the correction data stored in the non-volatile storage circuit to the control device when said transmitting means is in a first state, wherein said control device generates an inherent data signal corresponding to the inherent data and sends said inherent data signal to the driver, the driver adjusts the driving power applied to each of the print elements also in accordance with said inherent data signal.

20. The printer according to claim 19, wherein said inherent data comprises data representing a strobe time.

21. The printer according to claim 19, wherein said inherent data comprises average value data representing an average value of light emitted from each of the print elements, and said driver is responsive to a signal from the control device indicative of a strobe time determined in accordance with said average value data for adjusting the driving power applied to each of the print elements in accordance with the determined strobe time.

22. The printer according to claim 19, wherein the driver includes a shift register for sequentially transferring the print data and the correction data to corresponding drive elements; and the inherent data is stored at such addresses in the non-volatile storage circuit, that when data, including the inherent data and the correction data, are sequentially read from the non-volatile storage circuit, the inherent data is read before the correction data is read.

23. The printer according to claim 19, wherein said inherent data comprises data representing characteristics of the print head.

24. A printer comprising:

a control device;

a printer head including
   a plurality of print elements, and
   a driver formed of
      a volatile, relatively high-speed, storage section for storing correction data, and
         a plurality of drive elements for selectively supplying and adjusting driving power applied to respective corresponding ones of the print elements in accordance with print data representing an image to be printed and the correction data, wherein each of the print elements prints a dot when the driver supplies driving power thereto;

a non-volatile, relatively low-speed, storage circuit for receiving the correction data from the control device, and storing the received correction data and inherent data of the print head; and means for transmitting the inherent data and the correction data stored in the non-volatile storage circuit to the control device, wherein
   the control device generates an inherent data signal corresponding to the inherent data and sends the inherent data signal to the driver,
   the driver adjusts the driving power applied to each of the print elements also in accordance with the inherent data signal, and
   the means for transmitting reads the inherent data before the correction data is read.

25. The printer according to claim 24, wherein the inherent data comprises data representing a strobe time.

26. The printer according to claim 24, wherein:

the inherent data comprises average value data representing an average value of light emitted from each of the print elements, and the driver is responsive to a signal from the control device indicative of a strobe time determined in accordance with the average value data for adjusting the driving power applied to each of the print elements in accordance with the determined strobe time.

27. The printer according to claim 24, wherein the inherent data comprises data representing characteristics of the print head.

* * * * *